Patented Aug. 15, 1939

2,169,521

UNITED STATES PATENT OFFICE 2,169,521

PINEAPPLE GATHERING MACHINE

Alfred Y. Chong, Paia Maui, Territory of Hawaii

Application May 13, 1938, Serial No. 207,814

2 Claims. (Cl. 198—79)

This invention appertains to new and useful improvements in crop harvesting machines and more particularly to a machine for gathering pineapples.

The principal object of the present invention is to provide a machine capable of traveling at a very low speed so that pineapple pickers can deposit the pineapples they pick onto the machine, and these pineapples are conveyed to a particular place on the machine where their heads are removed, preparatory to depositing of the pineapples in a carrier bin.

Other important objects and advantages of the invention will become apparent to the reader of the following specification.

In the drawings—

Figure 3:
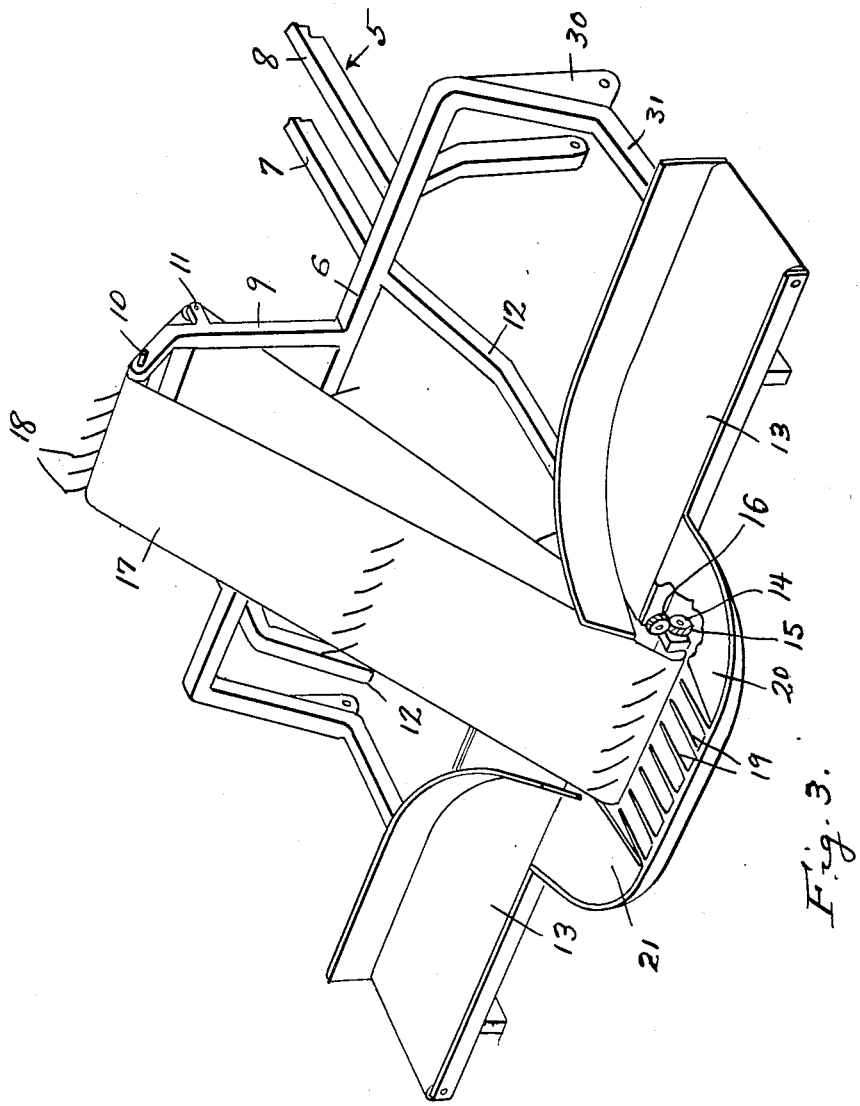
Figure 3 is a fragmentary perspective view of the rear portion of the machine.

Referring to the drawings, wherein like numerals designate like parts, it can be seen that numeral 5 generally refers to the frame, which as shown in Figure 3, consists of the transverse bar 6 at the rear portion thereof from which extends forwardly the pair of bars 7—8 adjacent each end of the bar 6. Bolts 9—9 rise from the bar 6 and are provided with horizontal shafts 10—11 mounted thereon.

Extending from the bar 6 are the converging bars 12 which engage under the inner end portions of the endless conveyors 13—13. The rear ends of the bars 12 support the horizontal shaft 14 which has the worm gear 15 thereon meshing with the worm gear 16 of the conveyor 13 at each end, of the shaft 14. The shaft 14 carries a roll as do the shafts 10 and 11 and over these rolls are trained the belt 17 which at equal spaced points along its length is provided with a transverse row of tines 18 which are movable upwardly through the prong formed bottom 19 of the pan structure 20, each end of which is provided with a sloping portion 21 leading on to the prong formed bottom 19 from the corresponding conveyor 13.

The frame bars 7—7 extending forwardly beyond the cross-bar 22 connect the forward ends of the bars 8—8. The forward end portions of the bars 7—7 are intended to support the internal combustion engine 23 which has the drive shaft 24 extending rearwardly under the frame to the differential 25, the shaft of which through drives 26—26, drives the transverse shaft 27, which in turn through sprockets and chains 28, drive the rear wheels 29. These rear wheels have their axles disposed through the webs 30 on the rearwardly disposed end portions 31 of the rear transverse bar 6. (See Figure 3.)

Mounted on one of the longitudinal bars 7 is the steering wheel shaft 32 having the steering wheel 33 and this shaft is geared up with the transverse shaft 34 which has the arms 35 connected to one end of the connection rod 36. This rod extends to one end of the bell crank 37 which is rigidly attached to the upper end of the vertical shaft 38 which at its lower end has an outwardly disposed front wheel spindle 39.

At the opposite end of the bar 22, a downwardly disposed leg 40 is provided at its upper and lower ends with ears through which the vertical shaft 41 are disposed, the upper end of this shaft 41 being provided with the arm 42, to which the right end of the elongated connecting rod 43 connects, the opposite end, or left end connecting to the remaining end of the bell crank 37. The lower end of the vertical shaft 41 is also provided with a front wheel carrying spindles 44.

Figure 1:
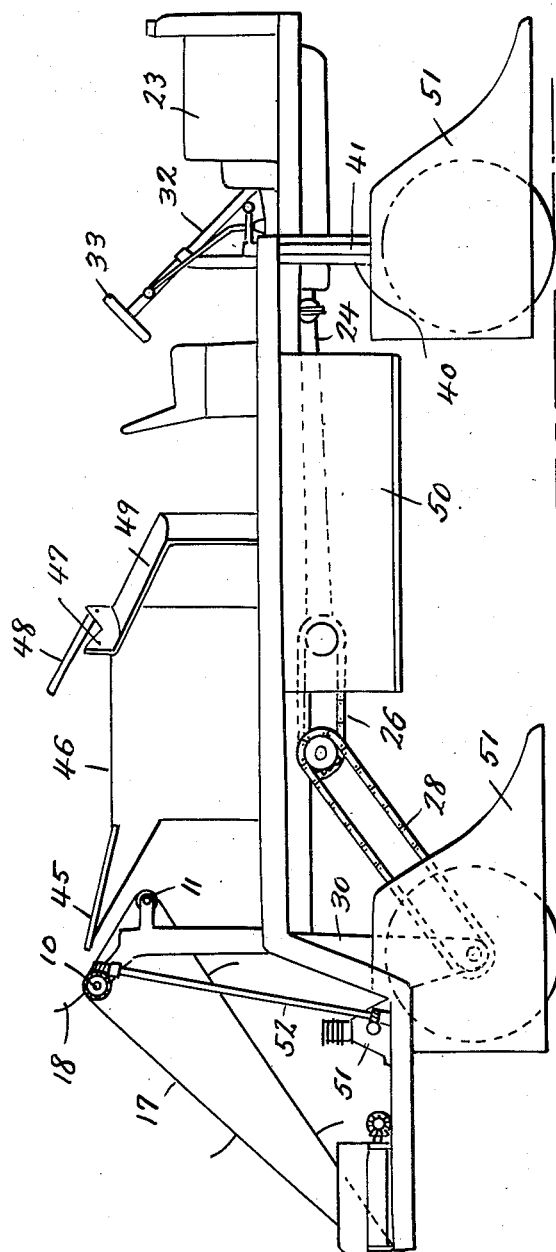
Figure 1 represents a side elevational view of the machine.
Figure 2:
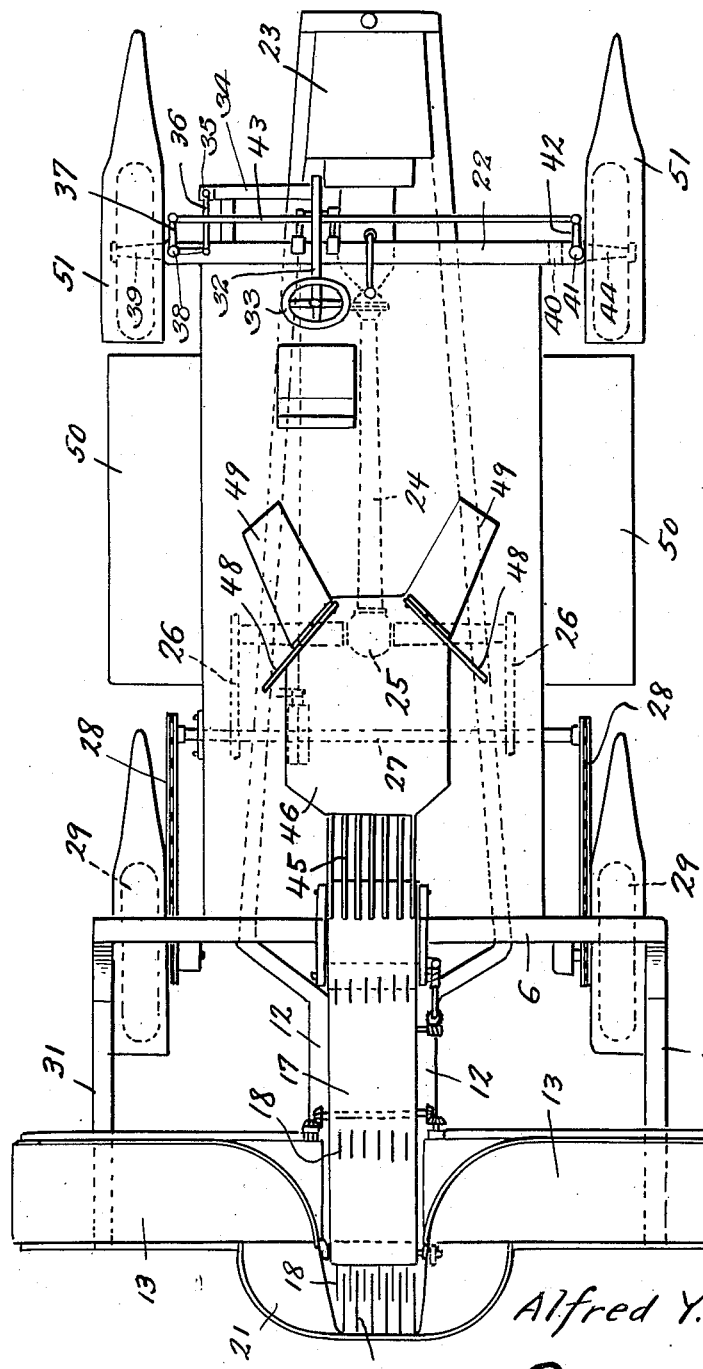
Figure 2 is a top plan view.

Referring to Figures 1 and 2, it can be seen that pineapples from the conveyor 17 are deposited onto the rearwardly inclined grating 45, down which the pineapples roll and onto the table 46, at each side of which a workman can stand.

At the forward corners of the table 46 are V-shaped cutters or blades 47 on which the top portion of a pineapple can be placed and cut off by the pivotal knife 48. A chute 49 extends downwardly from each of these blades 47 to direct pineapples into the carrying boxes 50, one of which is located at each side of the machine.

For driving the conveyor 17 a small internal combustion engine 51 is suitably supported on the rear portion of the frame and has its drive shaft geared with the driven shaft 52 which in turn is geared with the upper roll carrying shaft 10. Obviously, as the conveyor 17 travels, it will in turn drive the two conveyors 13—13 through the gears 15—16 at each end of the shaft 14.

It is to be understood that the machine can be provided with sufficient supporting surfaces adjacent the chutes 49 to accommodate a number of crates for receiving pineapples.

While the foregoing specification sets forth the invention in specific terms, it is to be understood that numerous changes in the shape, size and materials may be resorted to without departing from the spirit and scope of the invention as claimed hereinafter.

Having thus described the invention, what is claimed as new is—

1. A gathering machine of the character described comprising a frame, wheels for the frame, a conveyor inclinedly mounted at the rear portion of the frame, means for feeding picked pineapples inwardly from the sides of the machine to the conveyor, said means for feeding picked articles to the inclined conveyor consisting of horizontal conveyors extending inwardly from the sides of the frame and terminating at the lower end of the inclined conveyor, a pan shaped structure at the lower end of the conveyor to which the inwardly extending conveyors extend, said pan having inclined end portions and a prong formed bottom.

2. A gathering machine of the character described comprising a frame, wheels for frame, a conveyor inclinedly mounted at the rear portion of the frame, means for feeding picked pineapples inwardly from the sides of the machine to the conveyor, said means for feeding picked articles to the inclined conveyor consisting of horizontal conveyors extending inwardly from the sides of the frame and terminating at the lower end of the inclined conveyor, a pan shaped structure at the lower end of the conveyor to which the inwardly extending conveyors extend, said pan having inclined end portions and a prong formed bottom, said inclinedly mounted conveyor including a web having outwardly extending tines adapted to pass between the prongs of the pan bottom in lifting picked articles from the pan.

ALFRED Y. CHONG.